(12) United States Patent
Jeck et al.

(10) Patent No.: US 10,927,222 B2
(45) Date of Patent: Feb. 23, 2021

(54) PROCESS AND APPARATUS FOR PRODUCING AN AQUEOUS POLYMER SOLUTION

(71) Applicant: BASF SE, Ludwigshafen am Rhein (DE)

(72) Inventors: Sandra Jeck, Ludwigshafen (DE); Oliver Soetje, De Meern (NL); Tobias Bringmann, Ludwigshafen (DE); Gabriela Eugenia Fonseca Zepeda, Ludwigshafen (DE); Dirk Meckelnburg, Ludwigshafen (DE); Dennis Loesch, Ludwigshafen (DE); Bjoern Langlotz, Ludwigshafen (DE); John Barratt, Bradford (GB); Faissal-Ali El-Toufaili, Ludwigshafen (DE); Hazel Sprafke, Lampertheim (DE); Bernd Schube, Ludwigshafen (DE); Markus Ostermayr, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/096,515

(22) PCT Filed: Apr. 20, 2017

(86) PCT No.: PCT/EP2017/059392
§ 371 (c)(1),
(2) Date: Oct. 25, 2018

(87) PCT Pub. No.: WO2017/186567
PCT Pub. Date: Nov. 2, 2017

(65) Prior Publication Data
US 2019/0292330 A1    Sep. 26, 2019

(30) Foreign Application Priority Data

Apr. 26, 2016  (EP) .................................... 16167005

(51) Int. Cl.
| | |
|---|---|
| *C08J 3/05* | (2006.01) |
| *B01F 5/02* | (2006.01) |
| *B01F 5/04* | (2006.01) |
| *B01F 5/20* | (2006.01) |
| *B01F 7/00* | (2006.01) |
| *C08F 220/04* | (2006.01) |
| *C08F 220/56* | (2006.01) |
| *B01F 3/12* | (2006.01) |
| *B01F 1/00* | (2006.01) |
| *C08F 2/10* | (2006.01) |
| *B01F 5/00* | (2006.01) |

(52) U.S. Cl.
CPC .................. *C08J 3/05* (2013.01); *B01F 3/12* (2013.01); *B01F 3/1221* (2013.01); *B01F 5/0256* (2013.01); *B01F 5/0275* (2013.01); *B01F 5/045* (2013.01); *B01F 5/0451* (2013.01); *B01F 5/0471* (2013.01); *B01F 5/20* (2013.01); *B01F 7/0075* (2013.01); *C08F 220/04* (2013.01); *C08F 220/56* (2013.01); *B01F 2001/0044* (2013.01); *B01F 2005/0034* (2013.01); *C08F 2/10* (2013.01); *C08J 2333/02* (2013.01); *C08J 2333/26* (2013.01)

(58) Field of Classification Search
USPC ....................................................... 528/499
See application file for complete search history.

(56) References Cited

U.S. PATENT DOCUMENTS

| | | | |
|---|---|---|---|
| 4,113,688 | A | 9/1978 | Pearson |
| 4,274,749 | A | 6/1981 | Lake et al. |
| 4,529,794 | A | 7/1985 | Sortwell et al. |
| 4,531,673 | A | 7/1985 | Holland et al. |
| 4,845,192 | A | 7/1989 | Sortwell et al. |
| 4,874,588 | A | 10/1989 | Sortwell et al. |
| 5,344,619 | A | 9/1994 | Larwick et al. |
| 5,660,466 | A | 8/1997 | Hopson et al. |
| 2016/0129418 | A1* | 5/2016 | Pham ........................ B01F 3/12 422/600 |

FOREIGN PATENT DOCUMENTS

| | | |
|---|---|---|
| EP | 0 725 084 A1 | 8/1996 |
| EP | 2 179 784 A1 | 4/2010 |
| WO | WO 2004/007894 A2 | 1/2004 |
| WO | WO 2006/117292 A1 | 11/2006 |
| WO | WO 2009/050040 A1 | 4/2009 |
| WO | WO 2014/049513 A1 | 4/2014 |

OTHER PUBLICATIONS

International Search Report dated Jul. 3, 2017 in PCT/EP2017/059392 filed Apr. 20, 2017.
Extended European Search Report dated Nov. 15, 2016 in Patent Application No. 16167005.4.
L.Z. Rogovina, et al., "Definition of the Concept of Polymer Gel", Polymer Science Series C, vol. 50, No. 1, Sep. 2008, pp. 85-92.
U.S. Appl. No. 16/096,169, filed Oct. 24, 2018, Hazel Sprafke, et al.
U.S. Appl. No. 16/096,229, filed Oct. 24, 2018, Hazel Sprafke, et al.
Office Action dated Feb. 26, 2020 in Colombia Patent Application No. NC2018/0011482 (w/ English translation).

* cited by examiner

*Primary Examiner* — Terressa Boykin
(74) *Attorney, Agent, or Firm* — Oblon, McClelland, Maier & Neustadt, L.L.P.

(57) ABSTRACT

A process for producing an aqueous polymer solution, including: (a) providing a hydrated polymer that has been prepared by aqueous solution polymerisation of ethylenically unsaturated monomers, which hydrated polymer contains at least 10% by weight active polymer; (b) cutting the hydrated polymer by subjecting the hydrated polymer to at least one cutting stage containing at least one stream of aqueous liquid at a pressure of at least 150 bar to reduce the size of the hydrated polymer; and (c) dissolving the hydrated polymer in an aqueous liquid so as to obtain an aqueous polymer solution. An apparatus for producing an aqueous polymer solution.

25 Claims, 4 Drawing Sheets

PROCESS AND APPARATUS FOR PRODUCING AN AQUEOUS POLYMER SOLUTION

The present invention relates to a process and an apparatus for producing aqueous polymer solutions from hydrated polymer. The invention is of particular value to polymers that have been prepared by aqueous solution polymerisation of ethylenically unsaturated monomers to provide a hydrated polymer. Typically, the hydrated polymer would be in the form which is typically referred to as a gel.

It is commonplace to provide water-soluble polymers in the form of dry polymer powders. Such dry polymer powders are normally made up into aqueous polymer solutions at the site where they are intended to be used. This typically involves dispersing the dry polymer powders into water and allowing the polymer powder to hydrate and gradually dissolve. This is normally achieved by employing make up equipment.

Typically, the water-soluble polymers will be formed from water-soluble ethylenically unsaturated monomers.

Water-soluble particulate polymers are by nature hygroscopic and are notoriously difficult to add to water in order to mix into homogenous aqueous solutions. If the powder is added to water incorrectly the hydrating polymer particles can stick to the make up equipment and/or to each other, resulting in lumps or agglomerates of polymer in the aqueous polymer solution. Unfortunately, such lumps or agglomerates tend not to dissolve once they have formed. It is normally important that the solutions of polymer are substantially homogenous, since otherwise in the various chemical treatment applications to which these solutions are applied, the dosing equipment may become blocked or lumps/agglomerates may adversely affect the particular process.

Since water-soluble polymers readily absorb water and become sticky, care has to be taken in the transfer of dry polymer powder into the make up equipment. Desirably the particles of the polymer should remain as individual entities and hydrate separately. However, material wetting and make up equipment can become blocked because the particulate material becomes hydrated prematurely. This can happen if particles stick to damp services. Frequently, this can happen in the proximity of the wetting equipment where water is blocked by with the particulate material, for instance, where too much particulate material or agglomerates of material is fed into the mixing equipment. This often results in this part of the equipment becoming blocked with gel or with layers of concretions which can stop the process and/or cause spillage of particulate material. Consequently, the operation will require regular maintenance.

Most commercially available powder make-up systems employ a screw feeder to meet the powder to the powder/water mixing process. This consists of an Archimedes Screw type augur or scroll connected to a drive motor.

Some systems feed the particulate polymer by a screw action at a controlled rate directly into a wetting apparatus position directly below the screw feeder outlet due. This type of system is described in U.S. Pat. Nos. 4,531,673, 5,344,619 and 5,660,466.

WO 2004/007894 reveals a process for hydrating polymer to form a high concentration polymer or slurry for oilwell applications. The polymer is screw fed into a venturi cyclone pre-wetting device and the wetted powder water mixture is passed through a high shear mixer and then into a blender.

U.S. Pat. No. 4,274,749 discloses a device for dispersing fluid polymeric material in a liquid diluent without degradation of polymer chain length. The device includes a body having a generally T-shaped interior cavity with a pair of opposed inlets and a side outlet. One inlet holds a diluent injection assembly while the other holds a polymer injection assembly. The juxtaposition of the front ends of the injection assemblies within the interior cavity creates a zone where concurrent streams are premixed and an orifice where the pre-mix is immediately subjected to high shear forces. The continuous online supply of a polymer dispersion to a point of use incorporates a dispersing device, a metering pump for supplying polymer and a small detection tank, which ages the dispersion for about a minute before it is delivered to a conduit leading to the point of use. Under the brief summary of the invention it is stated that a relatively simple device has been developed for dispersing a fluid polymeric material into a diluent liquid stream which achieves homogenous dilution of the polymeric material. It is also indicated that when a diluent liquid, usually water, is supplied through the injection assembly and the nozzle and when the polymer fluid (usually a water in oil emulsion) is supplied through the polymer injection assembly the two streams meet head on.

EP 2179784 refers to a process for the preparation of an aqueous polymer dispersion solution, the polymer dispersion comprising essentially Guar, in which the process of transporting a polymer dispersion by a hose squeeze pump to an injector, and carrying out a shearing of the water mixed polymer dispersion in a pressure increasing pump.

U.S. Pat. No. 5,344,619 describes an apparatus for dissolving polymer into water in which particulate polymer is fed by means of a screw feeder from a storage hopper directly into the inlet of a wetting cone positioned vertically below the screw feeder outlet. This wetting device will typically be conical in shape or bowl shaped. Water is fed into the top of the cone in a way such that a swirl effect is achieved around the surfaces of the cone. Polymer particles fall onto the liquid surface and are carried to the bottom of the outlet of the cone, from where it is sucked into a liquid conveying line by the action of a water venturi. The water/polymer mixture is conveyed by momentum of the conveying water into a mixing tank, where it is mixed and aged before being transferred to a holding tank ready for dosing to a process to be treated.

WO 2009/050040 provides an apparatus and a method for preparing aqueous solutions or aqueous dilutions of water soluble or water swellable particulate material, such as particulate polymers. The equipment conveniently transfers the particulate material by means of an air stream along an air conveying line to a make at unit in which the material is hydrated or dissolved. The particulate material is fed along a scroll conveying line which is provided with a means for ensuring the material substantially fills the space between the scroll conveyor and the wall of the duct of the scroll conveying line. This is achieved by providing the scroll conveying line with an element that restricts the flow of the material exiting the scroll conveying line or that the scroll conveying line is mounted at a gradient or is in a substantially vertical orientation.

U.S. Pat. Nos. 4,529,794 and 4,874,588 teach a method for rapidly dissolving particles of dry water soluble polymer in water. A suspension of polymer particles is formed and subjected to conditions of high shear in a particle size reduction apparatus in which the finely divided particles are forced into solution. An apparatus is disclosed comprising an impeller which is rotatable at a high rate of speed, with a cylindrical array of generally radially directed blades circumferentially surrounding the impeller with outwardly directed discharge spaces defined between adjacent blades.

The aforementioned methods and devices are useful for forming aqueous polymer solutions and aqueous dilutions by starting from dry polymer particles. Frequently water-soluble polymers are shipped in the form of dry particulate products from the manufacturer to the location where they will be used. The polymers are then put into solution at the end-user location. It is generally considered more convenient to transport dry polymers rather than hydrated polymers because of the additional water content hydrated polymers containing which would inevitably increase the transportation costs. On the other hand, the process of converting hydrated polymer into dry particulate polymer is very energy consumptive.

U.S. Pat. No. 4,113,688 proposed a process for forming dilute aqueous solutions of water-soluble polymer from gels. In the process polymer gel is extruded, cut, and slurried in water. The slurry of gel particles is subjected to high shear forces immediately after slurry formation to form a slurry of very fine gel particles. This slurry of fine gel particles is mixed with additional water under low shear conditions to form the dilute aqueous solution of polymer. The water-soluble polymer gel is said to be extruded through die holes in an extrusion die plate into flowing water. The diameters of the die holes are from about 0.06 to about 0.50 inch.

U.S. Pat. No. 4,845,192 discloses a method in which particulate gels of water-soluble polymers are dissolved in water by forming a suspension of polymer gel particles in water, simultaneously with or immediately subsequent to the formation of the suspension, subjecting the suspension to instantaneous and momentary conditions of extremely high shear forces. The gel particles are finely sliced and dissolved. Homopolymer polyacrylamide gels are said to have a maximum water content of about 70 to 75 weight % and homopolymer acrylate salt gels are said to have maximum of about 60 weight %. In regard to the dissolution method and apparatus an apparatus proposed includes a gel extruder, which excludes gel through a die plate to produce gel particles and a particle size reduction apparatus. The particle size reduction apparatus is said to generally comprise a main housing supporting a motor, an impeller shaft housing and an impeller housing. The impeller is surrounded about its circumference by a cylindrical array of cutting blades. The impeller rotates and the leading edges of the blades define cutting edges for finally dividing particulate matter. Suitable equipment is said to be the Urschel Comitrol® Model 1500.

However, employing extruding equipment with scroll feeders and die plates to process gel polymers can be disadvantageous for a number of reasons. For instance, the operation of such equipment may be highly energy consumptive; lubricants may be required to facilitate progression of the polymer gel through the equipment; and the equipment is likely to require maintenance, for instance, to remove blockages and/or tenacious gel lumps.

An objective of the present invention is to provide a process and apparatus for efficiently processing hydrated polymer, that has been prepared from an aqueous solution polymerisation of ethylenically unsaturated monomers, which is often referred to as aqueous gel polymerisation, into an aqueous solution of the polymer. A further objective of the present invention is to provide such an aqueous solution of the polymer which overcomes the disadvantages of the prior art.

Thus according to the invention, we provide a process for producing an aqueous polymer solution comprising the steps of
(a) providing a hydrated polymer, that has been prepared by aqueous solution polymerisation of ethylenically unsaturated monomers, which hydrated polymer comprises at least 10% by weight active polymer;
(b) cutting the hydrated polymer by subjecting the hydrated polymer to at least one cutting stage comprising at least one stream of aqueous liquid at a pressure of at least 150 bar to reduce the size of the hydrated polymer,
(c) dissolving the hydrated polymer in an aqueous liquid so as to obtain an aqueous polymer solution.

According to the invention, we also provide an apparatus, for producing an aqueous polymer solution, comprising
(a) a means for providing a hydrated polymer, that has been prepared by aqueous solution polymerisation of ethylenically unsaturated monomers, which hydrated polymer comprises at least 10% by weight active polymer;
(b) at least one means for cutting the hydrated polymer in at least one cutting stage to reduce the size of the hydrated polymer, said at least one means comprising at least one stream of aqueous liquid at a pressure of at least 150 bar;
(c) means for dissolving the hydrated polymer in an aqueous liquid so as to obtain an aqueous polymer solution.

Figure 1:
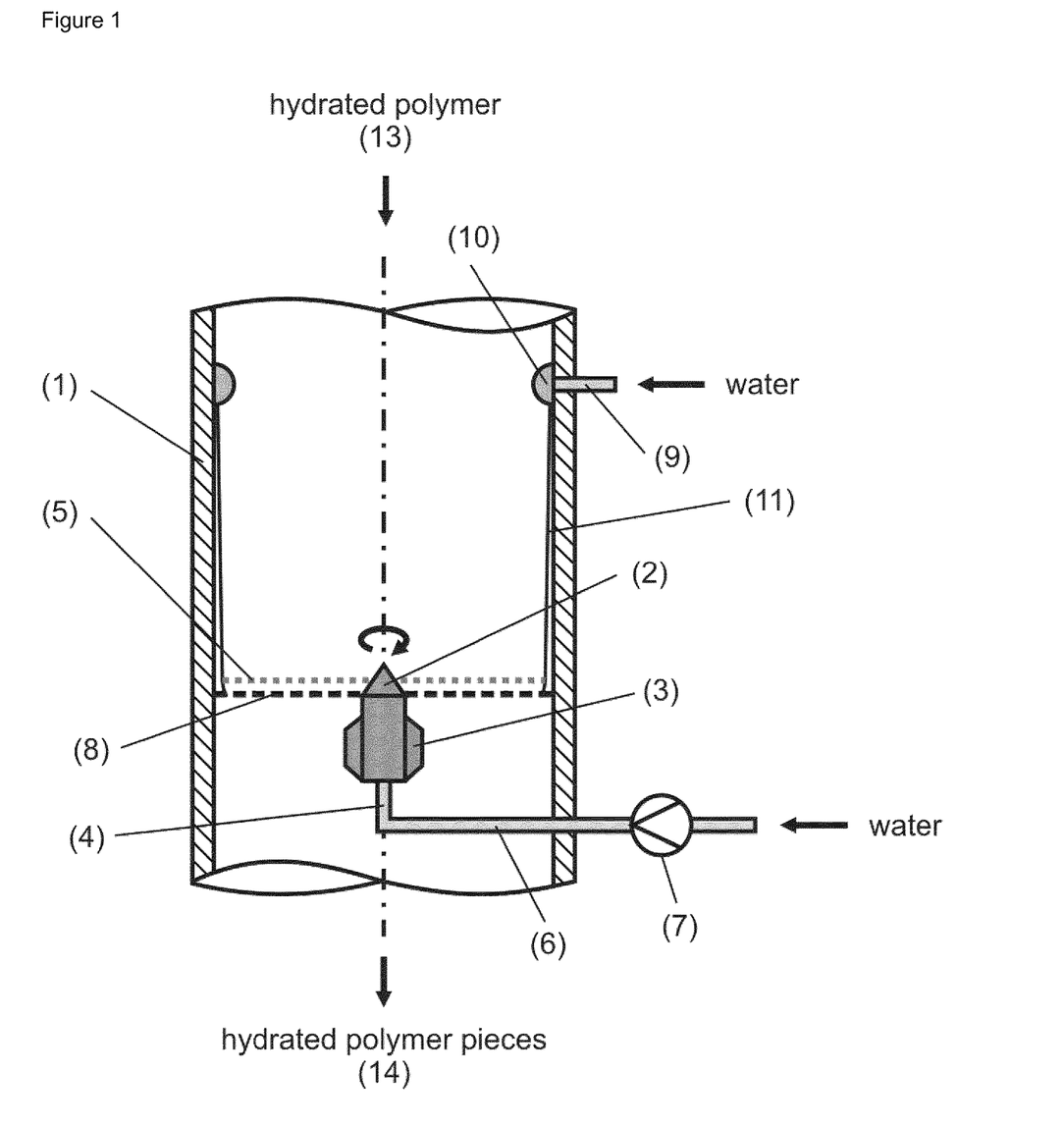

FIG. 1 illustrates a device for cutting the hydrated polymer into smaller pieces. The device comprises a surrounding wall section (1), in this case a tubular wall, surrounding a centrally mounted nozzle (2) which rotates and is driven by a motor (3) or proprelled by the flowing water, which forms the stream. The nozzle is supported on a fixed mounting (4). A high-pressure stream of water (5) is ejected perpendicular to the axis of the device and rotates as the nozzle rotates. The stream of water forms a circular disc pattern as the nozzle rotates. The nozzle is fed from a water feed line (6) supplied by a high pressure water source (7). A sieve tray (8) is located beneath the stream of water and prevents oversized polymer lumps from passing. A secondary water supply (9) of low pressure is fed into a ring main (10), in the form of an annulus, located at the upper end of the tubular wall. Water flows out of the annulus to form a water curtain (11), which prevents hydrated polymer from sticking to the tubular wall. Hydrated polymer (13) enters the tubular wall from above and passes down the device where it is cut by the high-pressure water stream to form cut hydrated polymer pieces which are small enough to pass through the sieve tray and then the cut hydrated polymer pieces (14) exit from the bottom of the device.

Figure 2A:
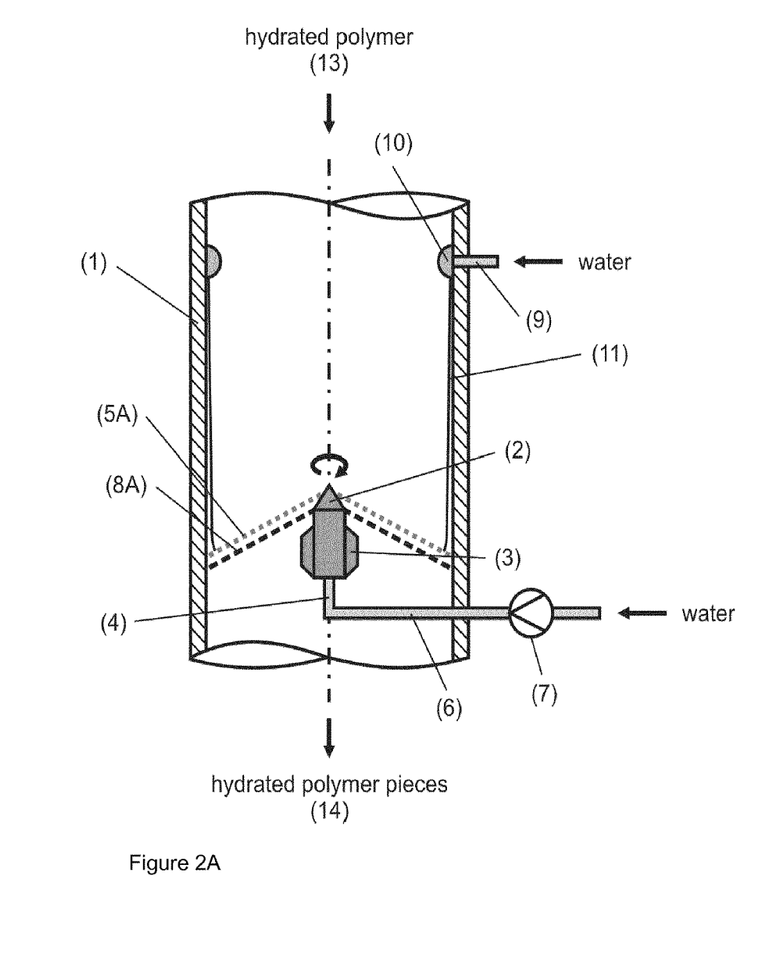

FIG. 2A illustrates a device analogous to the device of FIG. 1 except the nozzle (2) provides a high-pressure stream of water which is angled downwards (5A) to form a conical pattern as the nozzle rotates. The sieve tray is in the shape of an upright cone (8A). All other features are as in the case of FIG. 1.

Figure 2B:
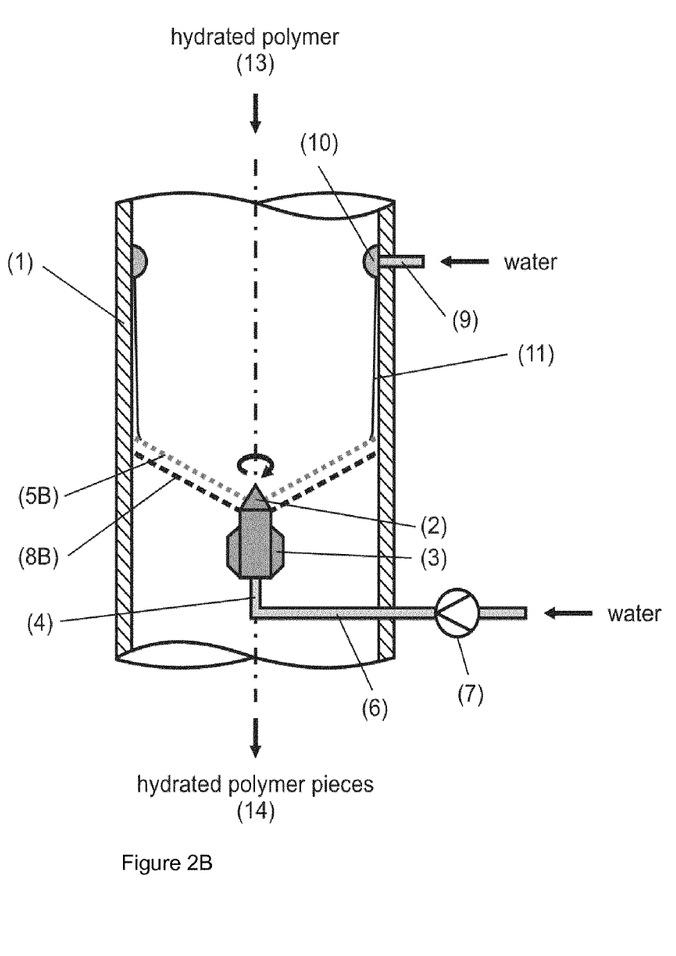

FIG. 2B illustrates a device analogous to the device of FIG. 2A except the nozzle (2) provides a high-pressure stream of water which is angled upwards (5B) to form a conical pattern as the nozzle rotates. The sieve tray is in the shape of an inverted cone (8B). All other features are as in the case of FIG. 1.

Figure 3:
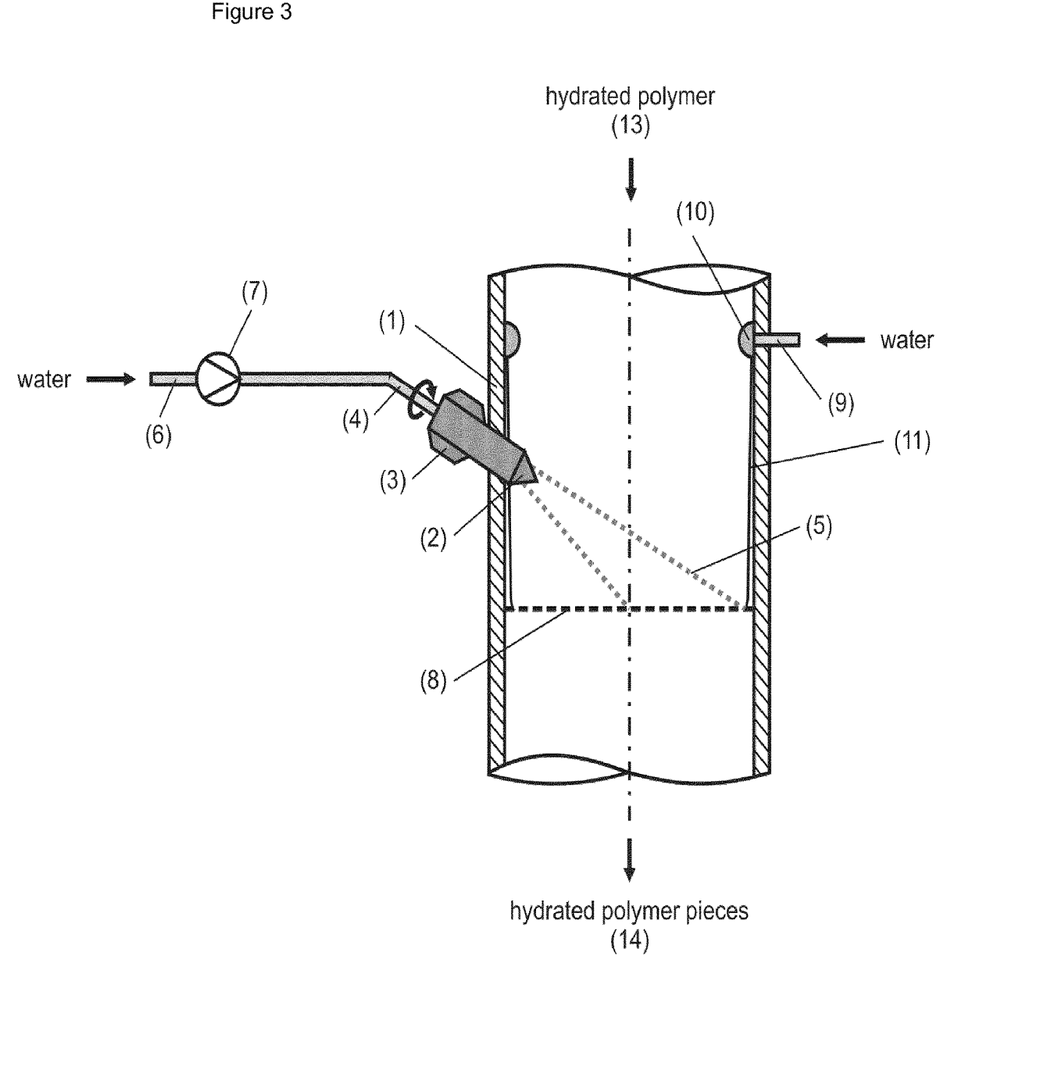

FIG. 3 illustrates a device analogous to the device of FIG. 1 except the nozzle (2) is positioned off centre to provide an eccentric high-pressure water stream (5) sweep pattern. All other features are as in the case of FIG. 1.

Figure 4:
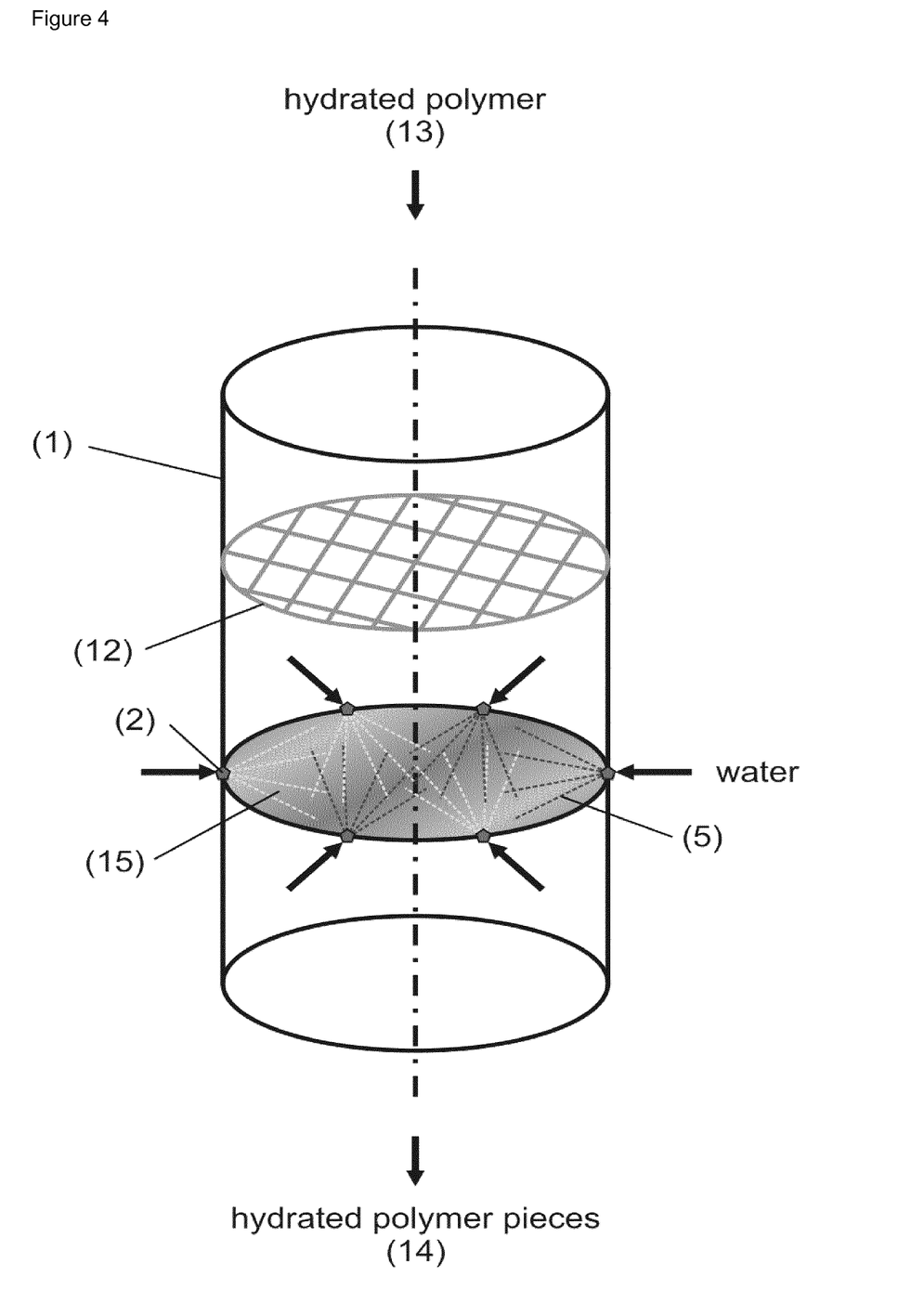

FIG. 4 illustrates a device for cutting the hydrated polymer to smaller pieces. The device comprises a surrounding wall section (1), in this case a tubular wall, into which the hydrated polymer (13) enters from the top. A mesh of cutting blades (12) initially cuts the hydrated polymer into strands as it descends. High-pressure water streams (5) are ejected from nozzles (2) that are positioned circumferentially. The nozzles each oscillate laterally to each generate a fan shaped water stream sweep pattern (15) which cut the polymer strands as they descend. The oscillation of the nozzles is driven by an actuator (not shown) in each case. The hydrated polymer pieces (14) exit through the bottom of the device.

The term hydrated polymer refers to an entity which contains polymer and water and should be in the form of an aqueous gel. Such an aqueous gel may be regarded as a polymer-water system in which there is a three-dimensional network structure composed of macromolecules or their associates and which is capable of retaining significant amounts of water. Such a system keeps its shape under the action of its own weight and differs in this feature from a polymer solution. Suitable definition of a polymer gel is given in the article by L Z Rogovina et al, Polymer Science, Ser. C, 2008, Vol. 50, No. 1, pp. 85-92. In general, the hydrated polymer provided in step (a) would exist as a single mass or volume typically having a volume in excess of 1000 cm$^3$.

The hydrated polymer comprises at least 10% by weight active polymer typically at least 20% by weight active polymer based on the weight of the hydrated polymer. Suitably the active polymer content may be from 20 to 70% by weight, desirably from 20 to 60%, often from 20 to 50%, preferably from 25 to 40%, for instance from 25 to 35%, or for instance from 35 to 40% by weight.

The hydrated polymer may dissolve in aqueous liquid provided in step (b) so as to obtain the aqueous polymer solution. Thus, steps (b) and (c) may be combined into a single step. However, it is preferred that step (b) precedes step (c). Thus, in one preferred aspect, in step (b) the hydrated polymer is cut into hydrated polymer pieces. Nevertheless, even in this preferred aspect where the hydrated polymer is cut into hydrated polymer pieces, at least some of the hydrated polymer may dissolve in aqueous liquid. Typically, it may be as the stream or streams of aqueous liquid used to cut the hydrated polymer contact or contacts the hydrated polymer that some polymer may dissolve. In this case step (b) may result in a mixture of hydrated polymer pieces and aqueous liquid containing hydrated polymer dissolved therein. In general, it is likely that most of the hydrated polymer will remain as hydrated polymer pieces in this step.

The cutting stage may conveniently be contained by a suitable wall. Typically, the cutting stage should be contained by at least one surrounding wall section. Typically, the surrounding wall section may be tubular, conical, frustoconical, pyrimidal section and any combination thereof. Preferably, the surrounding wall section is a tubular section, a conical section or a combination of tubular and conical sections. The tubular section may have any suitable cross-sectional shape, for instance circular, elliptical, triangular, square, rectangular, hexagonal or octagonal etc. Preferably, the tubular section is substantially cylindrical. Suitably, the surrounding wall section should have an inlet at one end and an outlet at the other end.

Hydrated polymer may then enter the surrounding wall section from one end, pass through the cutting stage to reduce the size of the hydrated polymer and desirably the so formed hydrated polymer pieces should exit from the outlet. Aqueous liquid from the cutting stage, desirably should also exit from the outlet.

As indicated previously, at least some of the hydrated polymer may dissolve during the cutting stage such that the aqueous liquid would optionally contain dissolved polymer. Thus, a mixture of hydrated polymer pieces and aqueous liquid optionally comprising a solution of the hydrated polymer may be formed in the cutting stage. Such a mixture should desirably exit from the outlet of the surrounding wall section.

The surrounding wall section of the cutting stage may be in any suitable orientation. Nevertheless, it is preferred that the surrounding wall section is substantially upright, with the inlet at the upper end and the outlet at the lower end. In this way the hydrated polymer should easily pass into the surrounding wall section through the inlet, be cut in the cutting stage and then the so formed polymer pieces easily pass out of the surrounding wall section through the outlet.

The passage of the hydrated polymer may be by gravity alone or may be fed into the cutting stage under pressure, for instance, by pumping, mechanically feeding, by gas pressure or by the action of a vacuum. Desirably the hydrated polymer is fed into the cutting stage (b) by means of gas pressure exerted on the contents of a reactor forming the hydrated polymer. Alternatively, or additionally, the hydrated polymer is fed into the cutting stage (b) by means of mechanical conveying devices, such as scrolls. It may also be desirable to lubricate the hydrated polymer in order to facilitate the exit from the reactor and/or entry into the cutting stage (b), for instance, by employing water or other aqueous liquid.

Suitably, the hydrated polymer may leave the reactor at a speed from 0.01 cm/s to 10 cm/s, for instance, from 0.02 cm/s to 7 cm/s, such as from 0.05 cm/s to 5 cm/s. Typically, this would be the same speed at which the hydrated polymer enters and progresses through the cutting stage (b). However, it may be preferable for the hydrated polymer to progress through the cutting stage (b) at a different speed to the speed that it leaves the reactor. For instance, the hydrated polymer may progress through the cutting stage (b) at a faster speed than the speed that it leaves the reactor or it may travel at a slower speed than the speed that it leaves the reactor. It may be desirable that the hydrated polymer progresses through the cutting stage (b) at a variable speed. Typically, the hydrated polymer may progress through the cutting stage (b) at one speed up to the point of being cut into pieces and the hydrated polymer pieces may then progress more quickly, particularly if the the surrounding wall section containing the cutting stage (b) is in an upright position and the progression of the hydrated polymer pieces is assisted by gravity. Typically, the hydrated polymer would progress through the cutting section at least up to the point where the hydrated polymer pieces are formed at a speed of from 0.01 cm/s to 10 cm/s, for instance, from 0.02 cm/s to 7 cm/s, such as from 0.05 cm/s to 5 cm/s.

It may be desirable for the surrounding wall section to be positioned in a non-upright position. For instance, it may be desirable for the surrounding wall section to be mounted at a gradient or even horizontally. However, it is preferred that the inlet to the surrounding wall section is higher than the outlet of the surrounding wall section. In this way the passage of the hydrated polymer through the surrounding wall section is at least in part, assisted by gravity. More preferably the surrounding wall section is substantially upright. This minimises the risk that the hydrated polymer or the polymer pieces come into contact with the wall of the surrounding wall section.

Desirably, the at least one stream of aqueous liquid, comprised by the at least one means (b) for cutting the hydrated polymer, flows from a nozzle having a nozzle orifice diameter of less than 3.00 mm, preferably from 0.25 mm to 2.00 mm.

The at least one stream of aqueous liquid has a pressure of at least 150 bar. The pressure may be considerably higher than this, for instance, up to 10,000 bar. However, it is not normally necessary for the pressure to be as high as this and lower pressures, for instance no higher than 7,500 bar are usually adequate. Typically, the pressure of the stream of aqueous liquid in the cutting stage has a pressure of from 150 bar to 5,000 bar, preferably from 200 bar to 2,000 bar, more preferably from 250 bar to 1000 bar. Typically, the stream of aqueous liquid would flow from a nozzle having a nozzle orifice of suitable diameter. In general, the nozzle orifice diameter should be less than 3.00 mm, often less than 2.00 mm, and usually no more than 1.00 mm. Normally, the nozzle orifice diameter should be at least 0.10 mm, for instance, from 0.25 mm to 2.00, or from 0.25 mm to 1.00 mm, suitably from 0.30 mm to 0.90 mm, desirably from 0.40 mm 0.80 mm. It may be desirable to employ a multiplicity of nozzles on a head in which each nozzle delivers a stream of aqueous liquid at the aforementioned pressures of at least 150 bar. When a multiplicity of nozzles on a head is employed the number of nozzles may be at least 2, for instance, from 2 to 10 nozzles. The nozzles may be arranged in one plane or in different planes. The nozzles may be arranged in such a way, for instance over a domed surface of the head, that the multiplicity of streams radiate out in different axises. Such a multiplicity of nozzles may be arranged such that the streams of aqueous liquid form an array each travelling in different directions.

By the term nozzle we mean a device which is designed to control the direction or the characteristics of a fluid flow, including to increase the velocity, as it exits.

The aqueous liquid of the stream in the cutting stage will normally be water. However, other aqueous liquids may be used for this purpose, for instance, aqueous solutions of inorganic electrolytes, such as an aqueous solution of sodium chloride or other salts. The aqueous liquid may for instance be brine. It may also be possible, or even desirable for the aqueous liquid to be water with other water-soluble materials dissolved therein. In some cases, it may even be desirable to employ an aqueous solution of the hydrated polymer to be dissolved. When the aqueous liquid is water, it may for instance be pure water, potable water, process water, demineralised water or recycled water. It may for instance be water which is available and typically employed for making up polymer solutions for enhanced oil recovery, tailings management operations or solid, liquid separation operations.

The cutting stage in step (b) of the invention may further comprise at least one static cutting member. The at least one static cutting member may for instance be one or more knives, blades, cutting wires or any combination thereof.

In one form the at least one cutting member may consist of a multiplicity of knives or blades mounted on the wall of the tubular section circumferentially with the knives or blades extending inwardly. In another form the at least one cutting member may be knives or blades mounted from a central position with the knives or blades extending out radially. In a further form the at least one cutting member may be a mesh of knives, blades or cutting wires. Typically, the static cutting member, where employed, should extend over the whole cross-section of the surrounding wall section.

Suitably, the hydrated polymer may be cut by contacting the at least one static cutting member before contacting the at least one stream of aqueous liquid. In the apparatus, this can be achieved by mounting the static cutting member between where the hydrated polymer enters the cutting stage (b) and the at least one stream of aqueous liquid is located. For instance, where the cutting stage comprises a surrounding wall section with an inlet and outlet, the static cutting member can be positioned closer to the inlet than would be the means for providing the aqueous stream.

Desirably, the at least one stream of aqueous liquid in step (b) is generated from at least one nozzle. In one preferred form the at least one nozzle oscillates. Such oscillation of the nozzle may produce a fan shaped water stream sweep pattern. In this form of the invention, it may be of particular value to employ a multiplicity of nozzles which can oscillate. Typically, the number of nozzles may be from 2 to 8, preferably from 2 to 6. It may also be desirable that a multiplicity of nozzles are arranged on at least one head, each head containing from 2 to 10 nozzles. It may be desirable for the multiplicity of heads, for instance, from 2 to 10 heads, each head containing the multiplicity of nozzles, to be employed. In this case each of the heads may separately oscillate.

Such multiplicity of nozzles or multiplicity of heads each of which houses a multiplicity of nozzles may be positioned circumferentially with respect to the hydrated polymer, such that the water streams extend inwardly. It may be desirable for the multiplicity of nozzles and/or multiplicity of heads each housing the multiplicity of nozzles to be positioned evenly such that the distance between all adjacent nozzles is equal. Alternatively, it may be desirable that the multiplicity of nozzles and/or multiplicity of heads each housing the multiplicity of nozzles not to be evenly spaced.

Thus, when the multiplicity of nozzles or multiplicity of heads each containing the multiplicity of nozzles are arranged circumferentially the hydrated polymer would then pass within the circumferentially positioned nozzles and be cut by the multiplicity of aqueous liquid streams. The at least one oscillating nozzle or head housing the multiplicity of nozzles may be moved by a suitable actuator mechanism. Where two or more oscillating nozzles are employed, it may be desirable for each nozzle to be moved by a separate actuator. It may even be desirable to employ a single motorised drive to operate the movement of all of the oscillating nozzles. Each oscillating nozzle may have a sweep of up to 180°. Typically, the sweep may be 30° to 180° and in one preferred form from 35° to 90°, for instance 35° to 75°, such as 40° to 60°. In an alternative form the sweep may be from 90° to 180°, for instance, from 120° to 160°. The exact range of the sweep will often depend on the exact number of nozzles employed. The oscillation frequency should for instance be up to 50 $s^{-1}$ (cycles per second), typically from 0.5 $s^{-1}$ to 50 $s^{-1}$, often from 5 $s^{-1}$ to 35 $s^{-1}$, such as from 10 $s^{-1}$ to 30 $s^{-1}$, desirably from 10 $s^{-1}$ to 25 $s^{-1}$. In another form the oscillation frequency may even be from 20 $s^{-1}$ to 50 $s^{-1}$, desirably from 30 $s^{-1}$ to 40 $s^{-1}$.

When the at least one nozzle, for instance, multiplicity of nozzles, or at least one head, for instance multiplicity of heads, each housing a multiplicity of nozzles is/are arranged circumferentially with respect to the hydrated polymer, each of the at least one nozzles or at least one head may rotate circumferentially about the hydrated gel. When the circumferentially arranged at least one nozzle or at least one head rotates it may be desirable that each nozzle or each head may independently oscillate as given above. Alternatively, it may be desirable that when the circumferentially arranged at least one nozzle or at least one head rotates they may not oscillate. The rotation of the at least one nozzle or at least one head may be achieved by a suitable drive mechanism. Desirably, the rotating at least one nozzle or at least one head may be held in a single housing which rotates. The housing may be a portion of the surrounding wall section or alternatively it may be mounted on the inside of the surrounding wall section.

In another preferred form of the invention, the at least one nozzle rotates and the stream of aqueous liquid generated forms a circular sweep pattern. The at least one nozzle may be a multiplicity of nozzles housed on at least one head. Such at least one rotating nozzle may be rotated by the action of a suitable motorised drive mechanism.

It may be desirable to employ more than one rotating nozzle, for instance, a multiplicity of nozzles housed on at least one head. However, it is usually only necessary to employ one rotating nozzle or where more than one nozzle is employed the multiplicity of nozzles are arranged on one head.

In one preferred aspect the at least one rotating nozzle, or at least one head housing a multiplicity of nozzles is mounted centrally and the aqueous liquid stream extends substantially perpendicular to the axis of the direction of the incoming hydrated polymer. In this form the aqueous liquid stream sweep pattern is disc shaped. In an adaptation of this preferred aspect the rotating nozzle or head containing a multiplicity of nozzles, which is/are mounted centrally, may generate at least one stream of liquid which is not perpendicular to the direction of the incoming hydrated polymer, but instead is angled such that the at least one aqueous liquid stream sweep pattern is a cone shaped, for instance, an upright cone where the at least one aqueous liquid stream is angled downwards, or an inverted cone where the at least one aqueous liquid stream is angled upwards. Where the at least one aqueous liquid stream is angled either upwards or downwards it is preferred that the angle is no more than 50° up or down from the position which is perpendicular to the direction of the incoming hydrated polymer. Preferably this angle should be from 5° to 45°, more preferably from 10° to 35°, particularly from 15° to 25°.

In a further embodiment of the invention, the at least one rotating nozzle or rotating head housing a multiplicity of nozzles is not mounted centrally but off centre. For instance, where the cutting stage is contained in a surrounding wall section the rotating nozzle may be located at or close to the wall of the surrounding wall section. Typically, the nozzle or head housing a multiplicity of nozzles would be orientated such that it generates at least one eccentric aqueous stream sweep pattern.

The rotating nozzle or rotating head may rotate at a frequency of up to 3000 rpm (revolutions per minute (i.e. 50 $s^{-1}$ cycles per second)). Typically, the nozzles or heads may rotate at from 500 rpm to 3000 rpm, desirably from 1000 rpm to 2000 rpm.

Desirably the cutting stage (b) will cut the hydrated polymer into numerous smaller sized pieces. The hydrated polymer pieces should conveniently have a size such that at least two dimensions are no more than 6.5 cm, preferably no more than 4 cm, more preferably no more than 2 cm. Preferably three dimensions of the hydrated polymer pieces should be no more than 6.5 cm, preferably no more than 4 cm, preferably no more than 2 cm. There is no lower limit necessary for the hydrated polymer pieces, since the smaller the pieces the easier it will be for the polymer to dissolve. Frequently, hydrated pieces may have a size such that three dimensions are as low as 0.1 cm or smaller. Often the hydrated polymer pieces tend to have three dimensions each of from 0.1 to 1.5 cm.

Generally, it is desirable that the hydrated polymer pieces should have a volume of no more than 275 $cm^3$, for instance from 0.0001 $cm^3$ to 275 $cm^3$, usually from 0.0005 $cm^3$ to 64 $cm^3$, typically from 0.001 $cm^3$ to 8 $cm^3$, for instance from 0.005 $cm^3$ to 3.5 $cm^3$.

The hydrated polymer pieces may have a surface area to volume of at least 0.8 $cm^{-1}$, for instance, at least 0.9 $cm^{-1}$, often from 0.9 $cm^{-1}$ to 130 $cm^{-1}$, usually from 1.5 to 100 $cm^{-1}$, typically from 2 to 60 $cm^{-1}$.

The cutting stage (b) may also comprise a sieve tray beneath the at least one stream of aqueous liquid. This is intended to prevent oversized hydrated polymer lumps from passing into the next stage. The sieve tray should have openings of a size corresponding to the maximum size of hydrated polymer pieces which should be allowed to pass to the next stage. Suitably the sieve tray may be a mesh formed by a plurality of inter-meshing wires or bars. Alternatively, the sieve tray may be formed as a surface with a plurality of holes cut therein, for instance, analogous to a colander. Typically, the sieve tray should be a static device. It should extend to cover the whole area below where the hydrated polymercutting is taking place. Where the cutting stage is contained by a surrounding wall section, the sieve tray may extend up to the wall of the surrounding wall section. Preferably, the sieve tray may be affixed to the surrounding wall section. It may also be desirable for additional streams of aqueous liquid to be directed at the surface of the sieve tray in order to facilitate the size reduction of the oversized hydrated polymer lumps captured by the tray. It may be desirable to employ one or more aqueous liquid streams of high-pressure, for instance, of at least 150 bar in order to facilitate the cutting of the oversized hydrated polymer lumps such that the hydrated polymer is cut into small enough pieces to pass through.

In the cutting stage (b) an amount of the hydrated polymer may even dissolve as the aqueous liquid stream or aqueous liquid streams cut the hydrated polymer.

Desirably a curtain of water or other aqueous liquid is provided on the inside of the surrounding wall section. The water or other aqueous liquid may be defined in the same way as any of the aqueous liquids or waters referred to above in regard to the stream of aqueous liquid of step (b). This curtain of water or other aqueous liquid may help prevent hydrated polymer from sticking to the wall of the surrounding wall section and reduce friction of the moving polymer thereby reducing necessary static pressure or avoiding additional mechanical means to move the polymer towards the cutting area. Such curtain of water or other aqueous liquid may be produced by providing a secondary water or aqueous liquid supply. Typically, the pressure of the water or other aqueous liquid should be below 30 bar, for instance, from 3 bar to 20 bar, desirably from 5 bar to 10 bar. The water or other aqueous liquid may be fed to a ring main, in the form of an annulus, and mounted on the inside of the surrounding wall section. In order to be most effective the ring main or annulus should be mounted at or close to the top of the surrounding wall section to provide the maximum protection by the curtain of water or other aqueous liquid. Desirably the water or other aqueous liquid flows from the ring main or annulus down the inner surface of the wall of the surrounding wall section as a curtain.

Dissolving the hydrated polymer in step (c) suitably employs a means (c) for dissolving the hydrated polymer in the aqueous liquid and comprises (c1) a mechanical processing device for subjecting the hydrated polymer pieces to further size reduction and complete or partial dissolution; and/or (c2) a mixing tank containing an aqueous liquid for receiving the hydrated polymer pieces of step (b) in order to effect dissolution of the hydrated polymer pieces.

Step (c) in which the hydrated polymer is dissolved in an aqueous liquid may be achieved by (c1) subjecting the hydrated polymer pieces to further size reduction and complete or partial dissolution by a mechanical processing stage. Typically, the apparatus would comprise a means i.e. a device for achieving this.

The aqueous liquid used in step (c) may be defined in the same way as any of the aqueous liquids or waters referred to above in regard to the stream of aqueous liquid of step (b).

Suitably the mechanical processing stage (c1) comprises a device for shearing and/or cutting the hydrated polymer pieces in the presence of an aqueous liquid and forming an aqueous solution of the polymer, optionally containing particles of undissolved hydrated polymer, wherein the aqueous solution of polymer, optionally containing particles of undissolved polymer, is passed into a mixing tank to allow any particles of undissolved polymer to dissolve, thereby providing the aqueous polymer solution. Typically, the apparatus for achieving this may comprise the aforementioned means for subjecting the pieces of hydrated polymer to further size reduction, a mixing tank and a means for passing the aqueous polymer solution, optionally containing particles of undissolved polymer into the mixing tank to allow any particles of undissolved polymer to dissolve.

The mechanical processing stage of step (c1) comprises a device for shearing and/or cutting the hydrated polymer pieces in the presence of an aqueous liquid or an aqueous solution of the polymer, optionally, containing particles of undissolved hydrated polymer. The mechanical processing stage may optionally also slice, grind and/or mill the hydrated polymer pieces.

The equipment for this mechanical processing stage may, for instance, be the equipment described in U.S. Pat. Nos. 4,529,794, 4,845,192. Desirably, it may be any of the equipment manufactured by Urschel Laboratories Inc. in the Comitrol® range, for instance, the Comitrol® 1700.

Suitably the equipment contains a chamber that comprises, a rotor driven by a motor; and a fixed stator consisting of a plurality of blades.

The mechanical processing stage typically involves conveying the hydrated polymer pieces into the chamber in the presence of aqueous liquid, suitably water. It is possible that the aqueous liquid (e.g. water) employed in the cutting stage (b) will be sufficient to allow this mechanical processing stage of step (c1). Nevertheless, it is preferred that additional aqueous liquid, suitably water, is fed into the chamber with the hydrated polymer pieces. In general, this would serve to prevent agglomeration of the hydrated polymer pieces and/or hydrated polymer particles resulting from the mechanical processing of the hydrated polymer pieces.

Suitably, the rotor would be surrounded about its circumference by a cylindrical array of cutting blades mounted on the fixed stator. The rotor desirably has protrusions about its circumference. These protrusions may be regarded as cutting tips. As the rotor rotates a gap is formed between the rotor cutting tips and the blades of the fixed stator. Hydrated polymer pieces are forced outwards by the centrifugal force of the rotating rotor and then would pass between the rotor and fixed stator and be sheared and/or cut resulting in the further size reduction of the hydrated polymer pieces. Typically, the shearing and/or cutting action would reduce the hydrated polymer pieces into finely divided slices or slivers of hydrated polymer which would quickly dissolve in the aqueous liquid.

Typically, the blades of the fixed stator may be mounted such that they are either parallel with the axis of the stator and/or perpendicular to the axis of the stator. In this arrangement, the blades may be perpendicular with respect to the circumference of the rotor. Alternatively, the blades may be angled about the axis of the stator such that the leading edge of the blades are angled against the direction of rotation of the rotor. The angle of rotation may be from 0 to 15°, with respect to the radius of the rotor.

Suitably the distance between the blades of the stator is from 200 μm to 2000 μm.

In one alternative form the protrusions of the rotor may be blades or knives. Such blades or knives may be in line with the radius of the rotor or tilted at an angle from 0 to 15°, such as 2 to 10°, with respect to the radius of the rotor.

The mechanical processing stage tends to quickly physically breakdown the hydrated polymer pieces which in the presence of the aqueous liquid quickly facilitates the formation of an aqueous solution of polymer. Nevertheless, it is likely that at least some small particles of undissolved hydrated polymer will remain in the so formed aqueous solution of polymer. Typically, these small particles of undissolved hydrated polymer may be in the form of slivers or other small particles. Such particles may have at least one dimension of less than 1.5 mm, for instance, from 0.1 to 0.5 mm, while the other dimensions may be larger. Preferably, all three dimensions are less than 1.5 mm.

In this aspect of the invention, the aqueous solution of polymer, optionally containing particles of undissolved hydrated polymer, is passed into a mixing tank in which any undissolved hydrated polymer is allowed to dissolve, thereby providing the aqueous polymer solution.

Since any undissolved hydrated polymer particles would tend to be small, they would normally dissolve rapidly. The speed of dissolution will tend to depend upon the type of polymer, the size of the undissolved hydrated polymer particles and the aqueous liquid used for forming the aqueous solution. The smaller the particles, the more rapid the dissolution will tend to be. In addition, water-soluble polymers will tend to dissolve more quickly when the aqueous liquid is water.

In an alternative form, step (c), in which the hydrated polymer is dissolved in an aqueous liquid, may be achieved by (c2) passing the hydrated polymer pieces of step (b) into a mixing tank containing an aqueous liquid to dissolve so as to form the aqueous polymer solution. The apparatus for achieving this may comprise a mixing tank and a means for passing the hydrated polymer pieces into the mixing tank and allowing the hydrated polymer pieces to dissolve.

In this alternative form of the invention defined by step (c2) the hydrated polymer pieces of step (b) are passed into a mixing tank containing an aqueous liquid, suitably water, and allowing the hydrated polymer pieces to dissolve, thereby providing the aqueous polymer solution.

The time taken for the hydrated polymer pieces to dissolve in the aqueous liquid, suitably water, will usually depend upon the size of the hydrated polymer pieces, the type of polymer and the aqueous liquid employed. The larger are the hydrated polymer pieces, the longer the dissolution time will tend to be. It is also generally true that the smaller the hydrated polymer pieces, the shorter the dissolution time will be. The hydrated polymer pieces will tend to dissolve more quickly in water, although acceptable dissolution rates can be achieved with other aqueous liquids, for instance solutions of electrolytes, for instance sodium chloride. In addition, the amount of agitation in the mixing tank may also influence the dissolution time. Typically, the more turbulence that is created in the mixing tank, the faster will be the dissolution. The mixing tank may be equipped with suitable one or more impellers and optionally with static mixing devices to generate high turbulence. Mixing may also be achieved by flowing the contents of the mixing tank out through a conduit and then recirculating back into the mixing tank.

The aqueous polymer solution of step (c), for instance (c1) and step (c2), may be up to 5% by weight of polymer based on the total weight of the aqueous polymer solution. Typically, the concentration of the polymer solution may be up to 2% by weight, for instance, from 0.01 to 2%, suitably from 0.05 to 1.5%, often, 0.1% to 1%. The aqueous polymer solution of step (c1) and step (c2) may subsequently be diluted to a desired concentration. The mixing tank in step (c1) and step (c2) may also be employed as a storage and/or maturation tank for the aqueous polymer solutions. Alternatively, the aqueous polymer solutions may be transferred to a subsequent tank, which is preferably stirred or mixed, for storage and/or maturation. By maturation we mean that the dissolved polymer molecules have had time to fully extend within the aqueous medium. It may be desirable for the aqueous polymer solution to be transferred into more than one storage tanks, for instance, a series of storage tanks. Typically, the aqueous polymer solution may be transferred to the application where it is used. This may be by means of piping or other suitable conduit.

It may be desirable to add any of various additives to the hydrated polymer or to the aqueous liquid used in the cutting stage (b) or the dissolving stage (c). Such additives may for instance be surfactants, lubricants, viscosity modifiers. Such additives may be closed typically used in enhanced oil recovery, tailings management operations or solids liquid separation operations. It may even be desirable to provide the hydrated polymer with such additives already contained therein.

Typically, the hydrated polymer would be provided by polymerising one or more water-soluble ethylenically unsaturated monomers. By water-soluble we mean that the ethylenically unsaturated monomer or monomers have solubility in water of at least 5 g per 100 mL of water at 25° C. Nevertheless, the hydrated polymer may be provided by polymerising a mixture of at least one water-soluble ethylenically unsaturated monomer with at least one ethylenically unsaturated monomers which are less soluble or insoluble in water, provided a hydrated polymer can be produced on polymerisation. The at least one ethylenically unsaturated monomers may be anionic, cationic, non-ionic or mixtures thereof.

Preferably, the hydrated polymer in step (a) is provided from an aqueous solution polymerisation of one or more water-soluble ethylenically unsaturated monomers. Suitably the aqueous solution polymerisation is carried out by initiating the polymerisation of an aqueous solution of the one or more water-soluble ethylenically unsaturated monomers in a suitable vessel. Typically, the aqueous monomer solution will contain the at least one water-soluble ethylenically unsaturated monomers in a concentration of at least 10% by weight of active monomer on total weight of the aqueous monomer solution. Suitably the monomer concentration should be from 20 to 70% by weight, preferably from 25 to 40%, and more preferably from 25 to 35%.

Any suitable initiator can be used. The initiator can be, for example, a peroxide, a persulfate, an azo compound, a sulfate, a redox couple or mixtures thereof.

Examples of peroxides are hydrogen peroxide, potassium peroxide, tert-butyl peroxide, tert-butyl hydroperoxide, cumene hydroperoxide and benzoyl peroxide. Examples of persulfates are ammonium, sodium or potassium persulfate. Examples of azo compounds are 2,2-azobisisobutyronitrile, 4,4'-azobis(4-cyanovaleric acid) and 2,2'-azobis(N,N'-dimethyleneisobutyramidine) dihydrochloride, 1,1'-azo-bis(cyclohexanecarbonitrile) and 2,2'-azobis(2-amidinopropane) dihydrochloride. Examples of sulfates are ferrous ammonium sulfate and ammonium sulfate. Redox couples consist of an oxidizing agent and a reducing agent. The oxidizing agent can be one of the above listed peroxides, persulfates, sulfates or azo compounds, or an alkali metal chlorate or bromate. Examples of alkali metals are given above. Examples of reducing agents are ascorbic acid, glucose or ammonium or alkali metal hydrogen sulfite, sulfite, thiosulfate or sulfide, or ferrous ammonium sulfate.

Preferably, the initiator is a mixture of a redox couple with one or more initiators selected from the group consisting of peroxides, persulfates and azo compounds.

More preferably, the initiator is a mixture of a redox couple, wherein the oxidizing agent is selected from the group consisting of peroxides and alkali metal bromates, and the reducing agent is selected from the group consisting of ammonium or alkali metal hydrogen sulfite, sulfite, thiosulfate or sulfide, or ferrous ammonium sulfate, with one or more azo compound initiators.

Even more preferably, the initiator is a mixture of a redox couple, wherein the oxidizing agent is selected from the group consisting of hydrogen peroxides and alkali metal bromates, and the reducing agent is an alkali metal hydrogen sulfite or sulfite, with one or more azo compound initiators.

Most preferably, the initiator is a mixture of a redox couple, wherein the oxidizing agent is selected from the group consisting of tert-butylhydroperoxide and potassium bromate, and the reducing agent is sodium sulfite, with one or more azo compound initiators selected from the group consisting of 2,2-azobisisobutyronitrile, 4,4'-azobis(4-cyanovaleric acid) and 2,2'-azobis(N,N'-dimethyleneisobutyramidine).

The aqueous solution of at least one ethylenically unsaturated polymer made desirably contain any of various additives. Examples of such additives include urea, sequesterants, organic acids, chain transfer agents and cross-linking agents.

Examples of sequesterant agents are diethylenetriaminepentaacetic acid, penta sodium salt, and diethylenediaminetetraacetic acid, tetra sodium salt.

Examples of organic acids are adipic acid, citric acid, oxalic acid, tartaric acid, malic acid and benzoic acid.

Examples of chain transfer reagents are thioglycolic acid, sodium hypophosphite, 2-mercaptoethanol, N-dodecyl mercaptan and tert-dodecyl mercaptan.

Examples of cross-linking agents are polyethylenically unsaturated monomer such as N,N'-monomethylenebisacrylamide, poly(ethylene glycol) diacrylate, tetra allyl ammonium chloride and di allyl phthalate.

Preferably, the aqueous medium also contains urea, a sequesterant agent and/or an organic acid. More preferably, the aqueous medium also contains urea, diethylenetriaminepentaacetic acid, penta sodium salt and/or an adipic acid.

If the polymer is cationic, the aqueous solution of monomer typically frequently also contains diethylenetriaminepentaacetic acid, penta sodium salt and adipic acid. If the polymer produced is anionic the aqueous monomer solution frequently also contains diethylenetriaminepentaacetic acid, penta sodium salt and urea. If the polymer produced is non-ionic, the aqueous monomer solution frequently may also contain diethylenetriaminepentaacetic acid, penta sodium salt, urea and adipic acid.

Suitable processes for carrying out the aqueous solution polymerisation of the at least one water-soluble ethylenically unsaturated monomers are described in EP 0725084 A1, WO 2006/117292 and WO 2014/049513.

Water-soluble ethylenically unsaturated monomers can be carboxylic acids of formula (I)

or salts thereof, in which $R^1$, $R^2$ and $R^3$ are the same or different and are hydrogen, $C_{1-2}$-alkyl, carboxy or $C_{1-2}$-alkyl substituted with carboxy, (II)

wherein $R^7$, $R^8$ and $R^9$ are the same or different and are hydrogen or $C_{1-2}$-alkyl, E is $C_{2-5}$-alkylene, $R^4$, $R^5$ and $R^6$ are the same or different and are $C_{1-4}$-alkyl and X is a suitable anion, amides of formulae (III)

or (IV)

or (V)

wherein $R^7$, $R^8$, $R^9$, E, $R^4$, $R^5$, $R^6$ and X have the meaning as indicated above, $R^{10}$ is hydrogen or methyl, L is $C_{2-5}$-alkylene, and M is a suitable cation, vinyl derivatives or diallylammonium derivatives.

Examples of carboxylic acids of formula I are acrylic acid, methacrylic acid, crotonic acid, itaconic acid, maleic acid and fumaric acid. Salts thereof can be ammonium, alkali metal salts thereof or alkaline earth metals salts. Examples of alkali metals are lithium, sodium and potassium. Examples of alkaline earth metals are beryllium, magnesium and calcium.

$C_{1-2}$-Alkyl can be methyl or ethyl. Examples of $C_{2-5}$-alkylene are ethylene, trimethylene, propylene, 2-methylpropylene, tetramethylene, ethylethylene and pentamethylene. Examples of $C_{1-4}$-alkyl are methyl, ethyl, propyl, isopropyl and butyl, isobutyl, sec-butyl and tert-butyl. Examples of suitable anions are halogenide, sulfate and $C_{1-4}$-alkylsulfate. An example of $C_{1-4}$-alkylsulfate is methylsulfate. Examples of a halogenide are bromide and chloride. A preferred halogenide is chloride. Examples of suitable cations are hydrogen, ammonium and alkali metal.

Examples of esters of formula II are dimethylaminoethylacrylate methyl chloride quaternary salt, diethylaminoethylacrylate ethyl chloride quaternary salt and dimethylaminoethylmethacrylate methyl chloride quaternary salt. Alternatively, this may be such compounds in which the quaternary salts using quaternising compound is other than methyl chloride, for instance dimethyl sulphate, or other alkyl halides, or alkyl sulphates or dialkyl sulphates.

Examples of amides of formulae III, IV or V are acrylamide, methacrylamide, crotonamide, dimethylaminoethylacrylamide methyl chloride quaternary salt, diethylaminoethylacrylamide ethyl chloride quaternary salt, dimethylaminoethylmethacrylamide methyl chloride quaternary salt and 2-acrylamido-2-methypropane sulfonic acid (including ammonium or alkali metal salts (for instance, sodium, potassium, lithium) or alkaline earth metals salts (for instance, calcium, magnesium, beryllium).

Examples of vinyl derivatives are vinylphosphonic acid or vinylsulfonic acid and salts thereof, such as ammonium or alkali metal salts thereof, N-vinylformamide, N-vinylpyrrolidinone and 1-vinylimidazole. An example of a diallylammonium derivative is diallyldimethylammonium chloride.

Water-insoluble ethylenically unsaturated monomers can be esters of carboxylic acids of formula I with a $C_{1-18}$-alkanol.

Examples of $C_{1-18}$-alkanols are methanol, ethanol, propanol, isopropanol, butanol, hexanol, 2-ethylhexanol and octadecanol.

Examples of water-insoluble ethylenically unsaturated monomers are methyl acrylate, ethyl acrylate, butyl acrylate, 2-ethyl hexyl acrylate, stearyl acrylate, methyl methacrylate and stearyl methacrylate.

More preferred ethylenically unsaturated monomers are water-soluble and are selected from the group consisting of carboxylic acids of formula (I)

or salts thereof, in which $R^1$, $R^2$ and $R^3$ are the same or different and are hydrogen or methyl, carboxy or methyl substituted with carboxy, esters of formula wherein $R^7$, $R^8$ and $R^9$ are the same or different and are hydrogen or methyl, E is $C_{2-3}$-alkylene, $R^4$, $R^5$ and $R^6$ are the same or different and are $C_{1-3}$-alkyl and X is a suitable anion, amides of formulae wherein $R^7$, $R^8$, $R^9$, E, $R^4$, $R^5$, $R^6$ and X have the meaning as indicated above, $R^{10}$ is hydrogen or methyl, L is $C_{2-5}$-alkylene, and M is a suitable cation, for instance, ammonium or alkali metal (for instance, sodium, potassium, lithium) or alkaline earth metals salts (for instance, calcium, magnesium, beryllium).

Examples of $C_{2-3}$-alkylene are ethylene, trimethylene and propylene. Examples of $C_{1-3}$-alkyl are methyl, ethyl, propyl and isopropyl.

Even more preferred ethylenically unsaturated monomers are water-soluble and are selected from the group consisting of carboxylic acids of formula or salts thereof, especially ammonium, alkali metal or alkaline earth metals salts, for instance, lithium, sodium, potassium, beryllium, magnesium or calcium salts, in which $R^1$ is hydrogen or methyl and $R^2$ and $R^3$ are both hydrogen, esters of formula wherein $R^7$ is hydrogen or methyl, and $R^8$ and $R^9$ are both hydrogen, E is ethylene, $R^4$, $R^5$ and $R^6$ are the same or different and are $C_{1-2}$-alkyl, and X is halogenide, sulfate or $C_{1-4}$-alkylsulfate, amides of formulae wherein $R^7$, $R^8$, $R^9$, E, $R^4$, $R^5$ and $R^6$ and X have the meaning as indicated above, $R^{10}$ is hydrogen or methyl, L is $C_{2-5}$-alkylene, and M is hydrogen, ammonium or an alkali metal (for instance, sodium, potassium, lithium) or alkaline earth metals salts (for instance, calcium, magnesium, beryllium).

Most preferred ethylenically unsaturated monomers are water-soluble and are selected from the group consisting of acrylic acid or salts thereof, esters of formula wherein $R^7$, $R^8$ and $R^9$ are hydrogen, E is ethylene, $R^4$, $R^5$ and $R^6$ are the same or different and are $C_{1-2}$-alkyl, and X is chloride, sulfate methosulfate or $C_{1-4}$-alkylsulfate, acrylamide and amides of formula wherein $R^7$, $R^8$, $R^9$ have the meaning as indicated above, L is $C_{2-4}$-alkylene, $R^{10}$ is hydrogen, and M is hydrogen, ammonium or an alkali metal (for instance, sodium, potassium, lithium) or alkaline earth metals salts (for instance, calcium, magnesium, beryllium).

Examples of $C_{2-4}$-alkylene are ethylene, trimethylene, propylene, 2-methylpropylene, tetramethylene and ethylethylene.

Most preferably the ethylenically unsaturated monomer is water-soluble and is either acrylamide or a mixture of acrylamide with water-soluble ethylenically unsaturated monomer selected from the group consisting of acrylic acid or salts (for instance, sodium acrylate, potassium acrylate, lithium acrylate, ammonium acrylate, calcium acrylate (including calcium diacrylate) and magnesium or beryllium salts of acrylic acid), thereof, and esters of formula (II)

wherein $R^7$, $R^8$ and $R^9$ are hydrogen, E is ethylene, $R^4$, $R^5$ and $R^6$ are the same or different and are $C_{1-2}$-alkyl, and X is chloride, sulfate, methosulfate or $C_{1-4}$-alkylsulfate.

Preferably, the amount of acrylamide in the mixture of acrylamide with water-soluble monomethylenically unsaturated monomer selected from the group consisting of acrylic acid or salts thereof, (for instance, sodium acrylate, potassium acrylate, lithium acrylate, ammonium acrylate, calcium acrylate (including calcium diacrylate) and magnesium or beryllium salts of acrylic acid), and esters of formula (II)

wherein $R^7$, $R^8$ and $R^9$ are hydrogen, E is ethylene, $R^4$, $R^5$ and $R^6$ are the same or different and are $C_{1-2}$-alkyl, and X is chloride, sulfate, methosulfate or $C_{1-4}$-alkylsulfate, is at least 30% by weight based on the weight of the monomer mixture.

When the monomer or mixture of monomers comprises acrylamide, the acrylamide may have been produced by a suitable process, for instance by hydrolysis of acrylonitrile. Typically, this may be one of the known chemically catalysed processes using inorganic catalysts such as Raney copper. Preferably however, the acrylamide would have been prepared using a biological or biologically catalysed process. Suitably this may be achieved by contacting acrylonitrile with a nitrile hydratase enzyme, for example as documented in the patents and literature. Superior polyacrylamide products may be obtained by employing the process of the present invention to polymerise acrylamide, optionally in combination with other ethylenically unsaturated monomers, wherein acrylamide has been obtained by a biological process. Such polyacrylamides would exhibit superior properties as flocculants for instance for water treatment (including sewage sludge treatment); mining applications, for instance in solids, liquids separation processes and tailings treatment processes; various oil industry applications, for instance, enhanced oil recovery, flooding, water stop applications, etc; and as retention/drainage aids in the paper industry.

Where the monomer, each monomer or monomer blend contains at least one of amphiphilic monomers and/or partially hydrophilic monomers desirably they may be any such monomers which are known in the literature.

Amphiphilic monomers or partially hydrophilic monomers are defined as ethylenic unsaturated based monomers which have at least one hydrophilic group and at least one hydrophobic group in its structure. The partial solubility in water can be based on the presence of anion and/or cation and/or other neutral hydrophilic moieties.

They include, for instance, acrylamide-derived cationic monomer (Formula I) or acrylate-derived cationic monomer (Formula II) containing a hydrophobic chain and with the general formula:

Where:
R1, R2, R3, R4, R5, R6, independently, can be a hydrogen or an alkyl chain containing 1 to 4 carbons Q: an alkyl chain containing 1 to 8 carbons R7: an alkyl or alkenyl or arylalkyl chain containing 6 to 30 carbons X: a halide selected from the group including chloride, bromide, iodide, floride or a counterion with a negative charge A preferred structure for formula (I) is when R1=R2=R3=R4=H, which generates an acrylamide moiety. Another preferred structure is obtained when R1=R2=R4 and R3=CH3. Then a methacrylamide derivative is generated.

Similar to formula (I), a preferred structure for formula (II) is when R1=R2=R3=H, which generates an acrylate moiety. Another preferred structure is obtained when R1=R2=H and R3=CH3. Then a methacrylate derivative is generated.

Among all alkyl possibilities for Q, preferably Q is either an ethyl or a propyl group Preferably, R5=R6 and are either methyl or ethyl moieties

For the substitute R7, preferred structures are hexyl, octyl, decyl, dodecyl, hexadecyl, octadecyl or benzyl.

Examples of preferred structures for the invention having the formula (I) are N-acrylamidopropyl-N,N,dimethyl-N-dodecyl ammonium chloride, N-methacrylamidopropyl-N,N,dimethyl-N-dodecyl ammonium chloride, N-acrylamidopropyl-N,N,dimethyl-N-dodecyl ammonium bromide, N-methacrylamidopropyl-N,N,dimethyl-N-dodecyl ammonium bromide, N-acrylamidopropyl-N,N,dimethyl-N-octadecyl ammonium chloride, N-methacrylamidopropyl-N,N, dimethyl-N-octadecyl ammonium chloride, N-acrylamidopropyl-N,N,dimethyl-N-octadecyl ammonium bromide, N-methacrylamidopropyl-N,N,dimethyl-N-octadecyl ammonium bromide, N-acrylamidopropyl-N,N,dimethyl-N-benzyl ammonium chloride, N-methacrylamidopropyl-N,N,dimethyl-N-benzyl ammonium chloride, N-acrylamidopropyl-N,N,dimethyl-N-benzyl ammonium bromide, N-methacrylamidopropyl-N,N,dimethyl-N-benzyl ammonium bromide.

Examples of preferred structures for the invention having the formula (II) are N,N-dimethylaminoethyl acrylate-N-dodecyl chloride, N,N-dimethylaminoethylmethacrylate-N-dodecyl chloride, N,N-dimethylaminoethyl acrylate-N-dodecyl bromide, N,N-dimethylaminoethyl methacrylate-N-dodecyl bromide, N,N-dimethylaminoethyl acrylate-N-octadecyl chloride, N,N-dimethylaminoethyl methacrylate-N-octadecyl chloride, N,N-dimethylaminoethyl acrylate-N-octadecyl bromide, N,N-dimethylaminoethyl methacrylate-N-octadecyl bromide, N,N-dimethylaminoethyl acrylate-N-benzyl chloride, N,N-dimethylaminoethyl methacrylate-N-benzyl chloride, N,N-dimethylaminoethyl acrylate-N-benzyl bromide, N,N-dimethylaminoethyl methacrylate-N-benzyl bromide Other amphiphilic monomer structures can be based on neutral hydrophilic groups. Their formula among other can be based on acrylate-derivative (Formula III) or allyl-derivative (Formula IV). In this case, the solubility is water is enhanced by the presence of ethylene oxide groups present.

Where:

k and l, are independently two positive real numbers included in the range from 0 to 100, with k+l>3

R1 can be a hydrogen or an alkyl chain containing 1 to 4 carbons

R2 can be an alkyl, alkenyl or arylalkyl chain containing from 1 to 30 carbons

Q can be O or NR4 where R4 is selected from H, alkyl, cycloalkyl, heterocycloalkyl, aryl or hetaryl R3 can be either H an alkyl group containing 1 to 30 carbons or an alkenyl group containing 3 to 30 carbons or an arylalkyl chain containing 6 to 30 carbons Preferably, R1 is either a hydrogen atom or a methyl group.

Preferably, k is a real number included in the range from 3 to 50 to bring the solubility in water.

Preferably, l is a real number included in the range from 0 to 30

Examples of preferred R2 groups for the formula (II) and (III) are methyl, ethyl, butyl, pentyl, hexyl, dodecyl, hexadecyl, octadecyl or benzyl Examples of R3 groups for the formula (II) and (III) are hydrogen, methyl, ethyl, hexyl, decyl, dodecyl, hexadecyl, octadecyl, benzyl or tristyrylphenyl One preferred substructures family derived for the formula (III) is accessible when the value of l in (III) is equal to zero. Then, a new the amphiphilic monomer based on neutral hydrophilic group can be defined by the Formula (V)

Where:

k is a positive real numbers included in the range from 0 to 100

R1 can be a hydrogen or an alkyl chain containing 1 to 4 carbons

R2 can be an alkyl, alkenyl or arylalkyl chain containing from 1 to 30 carbons

Q can be O or NR4 where R4 can be a hydrogen or an alkyl group containing 1 to 4 carbons R3 can be either H an alkyl group containing 1 to 30 carbons or an alkenyl group containing 3 to 30 carbons or an arylalkyl chain containing 6 to 30 carbons Preferably, R1 is either a hydrogen atom or a methyl group.

Preferably, k is a real number included in the range from 3 to 50 to bring the solubility in water.

Preferably, l is a real number included in the range from 0 to 30

Examples of R3 groups for the formula (V) are hydrogen, methyl, ethyl, hexyl, decyl, dodecyl, hexadecyl, octadecyl, benzyl or tristyrylphenyl Formula (V) include, among other, commercial products like for example Visiomer® C18 PEG 1105 MA W, Plex® 6877-0 or Lutencryl® 250 which are trade names for a methacrylate derivative based on C16C18 fatty alcohol ethoxylated. Sipomer® BEM is another example of commercial product which fulfils the formula (V). It is a methacrylate derivative based on behenyl alcohol ethoxylated. Another preferred example is Sipomer® SEM which is a polyoxyethylene methacrylate ω-tristyrylphenyl monomer.

Other amphiphilic monomer structures based on neutral hydrophilic groups can be described by the formula (V)

Where:

k and l and m, are independently three positive real numbers included in the range 0 to 100, with k+l+m>3

R1 can be a hydrogen or an alkyl chain containing 1 to 4 carbons

R2 can be either —$(C_nH_{2n})$— or —O—$(C_nH_{2n})$— or —C(O)—O—$C_nH_{2n}$— or —C(O)—$NR_7$—$C_nH_{2n}$— with R7 which can be a hydrogen or an alkyl containing 1 to 4 carbons. In all four different structures of R2, n is a whole number from 1 to 6

R3, R4, R5 are independently either H or an alkyl group containing 1 to 30 carbons or an arylalkyl group containing 6 to 30 carbons. Moreover, to be amphiphilic monomers, molecules based on the formula (VI) need to have at least one of the moieties R3, R4 or R5 equivalent to H. In this case, [CH2-CH(R$_i$)—O]$_x$ is a poly(ethylenoxide) group which is the neutral hydrophilic group of the structure R6 can be either H an alkyl group containing 1 to 30 carbons or an alkenyl group containing 3 to 30 carbons or an arylalkyl chain containing 6 to 30 carbons Preferably, R1 is either a hydrogen atom or a methyl group.

Examples of preferred R3, R4 or R5 groups for the formula (VI) are hydrogen, methyl, ethyl, butyl, pentyl, hexyl, dodecyl, hexadecyl, octadecyl or benzyl Examples of R6 groups for the formula (VI) are hydrogen, methyl, ethyl, hexyl, decyl, dodecyl, hexadecyl, octadecyl, benzyl or tristyrylphenyl.

Depending on the ethylenically unsaturated monomer or monomer mixture used, the polymers produced by the process of the present invention can be anionic, cationic or non-ionic.

The water soluble polymer may be nonionic (for instance polyacrylamide homopolymer) or anionic or cationic and is often formed from a blend of acrylamide or other water soluble non-ionic monomer with ionic monomer.

Desirably water-soluble polymers have a solubility in water of at least 5 g per 100 mL of water at 25° C.

The water soluble polymers are typically used as viscosifiers, coagulants or flocculants, including retention aids for paper making. The water-soluble polymers may also be used in the mining industry, for instance in solids, liquids separation processes and tailings management processes; and in the oil industry, for instance in enhanced oil recovery applications, flooding applications, water stop applications, etc. They can be anionic, cationic or non-ionic.

It is especially preferred that the hydrated polymer is selected from the group consisting of homopolymers of acrylamide, copolymers of acrylamide with sodium acrylate, and copolymers of acrylamide with calcium acrylate. By calcium acrylate, we also include calcium diacrylate.

Typically, the polymers have intrinsic viscosity (IV), of at least 2 dl/g, for instance, from 2 to 30 dl/g, typically from 2 to 25 dl/g, suitably from 4 to 20 dl/g, frequently from 5 to 16 dl/g. Another suitable range may be from 3 to 12 dl/g, for instance, from 6 to 10 dl/g. Other suitable ranges include from 10 to 25 dl/g.

Intrinsic viscosity of polymers may be determined by preparing an aqueous solution of the polymer (0.5-1% w/w) based on the active content of the polymer. 2 g of this 0.5-1% polymer solution is diluted to 100 ml in a volumetric flask with 50 ml of 2M sodium chloride solution that is buffered to pH 7.0 (using 1.56 g sodium dihydrogen phosphate and 32.26 g disodium hydrogen phosphate per litre of deionised water) and the whole is diluted to the 100 ml mark with deionised water. The intrinsic viscosity of the polymers is measured using a Number 1 suspended level viscometer at 25° C. in 1M buffered salt solution. Intrinsic viscosity values stated are determined according to this method unless otherwise stated.

The weight average molecular weight of the polymer should generally be at least 1 million, for instance at least 2 million and often at least 3 million, preferably at least 5 million. In some cases, the weight average molecular weight may be at least 7 million and sometimes at least 10 million. The weight average molecular weight may be as high as 18 or 20 million, for instance as high as 25 million or even as high as 30 million or higher. The molecular weight can be determined for example by static light scattering, small angle neutron scattering, x-ray scattering or sedimentation velocity.

The following examples are intended to illustrate the invention.

EXAMPLES

Linear Cutting

In each of the Examples 1 to 3 hydrated polyacrylamide in the form of a frustoconical polymer gel blocks (each designated Gel A) of active polymer content of about 30% by weight and measuring about 35 cm in height with a diameter at the top of about 20 cm and a diameter at the bottom of about 25 cm. Gel A was a copolymer of 70% by weight acrylamide and 30% by weight sodium acrylate. This polymer was prepared the same monomer recipe and with the same initiation and polymerisation conditions and in the same laboratory in Trostberg, Germany as an analogous polymer exhibiting an intrinsic viscosity of 24-26 dl/g.

Example 1

For each test a block of Gel A was placed on a flat surface. In each test a high-pressure water jet at different water pressure and nozzle speed was employed using a nozzle by Hammelmann, Type P having a diameter of 1 mm which was moved linearly over the top of the Gel A. The resulting cutting depth was measured and shown in Table 1.

TABLE 1

| Pressure bar | nozzle speed cm/s | Cutting Water l/min | cutting depth cm |
|---|---|---|---|
| 200 | 15 | 6.5 | 3.5 |
| 200 | 5 | 6.5 | 7 |
| 500 | 5 | 10.3 | 17 |
| 750 | 5 | 12.6 | 34 |

Example 2

Each test employed a block of Gel A was placed on a flat surface. For each test a high-pressure water jet at different water pressure was employed using a nozzle from Hammelmann, Type P with a diameter of 0.8 mm which was moved linearly over the top of the Gel A and the resulting cutting depth was measured and shown in Table 2.

TABLE 2

| Pressure bar | nozzle speed cm/s | Cutting Water l/min | cutting depth cm |
|---|---|---|---|
| 250 | 5 | 4.7 | 7 |
| 500 | 5 | 6.6 | 14 |
| 750 | 5 | 8.1 | 22 |
| 1000 | 5 | 9.3 | 28 |

Example 3

In each test a block of Gel A was placed on a flat surface. For each test a high pressure water jet at different water pressure was employed using a nozzle from Hammelmann, Type P with a diameter of 0.6 mm which was moved linearly over the top of the Gel A. The resulting cutting depth was measured and shown in Table 3.

TABLE 3

| Pressure bar | nozzle speed cm/s | Cutting Water l/min | cutting depth cm |
|---|---|---|---|
| 250 | 5 | 2.6 | 4 |
| 500 | 5 | 3.7 | 8.5 |
| 750 | 5 | 4.5 | 13 |
| 1000 | 5 | 5.3 | 18 |

Rotary Milling

Example 4

10 kg of a hydrated polyacrylamide gel, having an active polymer content of about 30% by weight, was cut into chunks of approximately 10 cm×10 cm×7 cm and designated Gel B. The hydrated polyacrylamide gel was prepared by solution polymerisation of aqueous solutions of 30% by weight sodium acrylate and 70% by weight acrylamide. This polymer was prepared the same monomer recipe and with the same initiation and polymerisation conditions and in the same laboratory in Trostberg, Germany as an analogous polymer exhibiting an intrinsic viscosity of 24-26 dl/g.

A tube with an inner diameter of 210 mm was positioned upright (i.e. in a vertical position with one end of the tube at the top, the other end of the tube at the bottom) and equipped with a 4 mm mesh at the bottom end of the tube. A rotary cutting head with 6 nozzles Type P and 0.6 mm diameter (manufacturer Hammelmann) was mounted on the inside wall of the tube by inserting through an opening cut in the side of the tube. The rotation axis of the rotary cutting head was aligned at ~20° to the horizontal axis and oscillated in an angle of ~45°. Water pressure was set at 1000 bar.

For each test one of the Gel B chunks was placed inside the top of the tube and weighted with a lid which weighed approximately 10 kg. As the chunk of Gel B was forced down the tube by the weight of the lid it was cut into small pieces by the water jets from the rotary cutting head. The results are shown in Table 4.

TABLE 4

| Cutting Time [sec] | Head Revolutions [1/min] | Result |
|---|---|---|
| 50 | 1500 | the gel was completely cut to pieces <5 mm and discharged via the mesh; gel partly dissolved in the water |
| 30 | 1500 | the gel was incompletely cut, pieces larger 5 mm up to several cm diameter still present above mesh |
| 30 | 3000 | very little gel cut, only a small cavity cut into the chunks nearest to the milling head |
| 30 | 750 | gel completely cut, very little gel dissolved |

Example 5

A tube with an inner diameter of 210 mm was positioned upright (i.e. in a vertical position with one end of the tube at the top, the other end of the tube at the bottom) and equipped with a 1 mm mesh of the tube and the bottom end of the tube. A rotary cutting head with 6 nozzles Type P and 0.6 mm diameter (manufacturer Hammelmann) was mounted on the inside wall of the tube by inserting through an opening cut in the side of the tube. The rotation axis of the rotary cutting head was aligned at ~20° to the horizontal axis and oscillated in an angle of ~45°. Water pressure was set at 1000 bar.

A further of the Gel B chunks, as described in Example 5, was placed inside the top of the tube and weighted with a lid which weighed approximately 10 kg. As the chunk of Gel B was forced down the tube by the weight of the lid it was cut into small pieces by the water jets from the rotary cutting head. The results are shown in Table 5.

TABLE 5

| Cutting Time [sec] | Head Revolutions [1/min] | Result |
|---|---|---|
| 50 | 1500 | the gel was completely cut to pieces <5 mm and discharged via the mesh; gel partly dissolved in the water |
| 30 | 1500 | the gel was incompletely cut, pieces larger 5 mm up to several cm diameter still present above mesh |
| 30 | 3000 | very little gel cut, only a small cavity cut into the chunks nearest to the milling head |
| 30 | 750 | gel completely cut, very little gel dissolved |

The invention claimed is:

1. A process for producing an aqueous polymer solution, comprising: (a) preparing a hydrated polymer by aqueous solution polymerisation of ethylenically unsaturated monomers, wherein the hydrated polymer comprises at least 10% by weight active polymer;
   (b) cutting the hydrated polymer by subjecting the hydrated polymer to at least one cutting stage comprising at least one stream of aqueous liquid at a pressure of at least 150 bar to reduce the size of the hydrated polymer; and
   (c) dissolving the hydrated polymer in an aqueous liquid so as to obtain an aqueous polymer solution.

2. The process according to claim 1, wherein in the cutting (b), the hydrated polymer is cut into hydrated polymer pieces.

3. The process according to claim 1, wherein the cutting stage in (b) is contained by a surrounding wall section with an inlet at one end and an outlet at the other end.

4. The process according to a claim 1, wherein the at least one stream of aqueous liquid of the cutting (b) has a pressure of from 150 bar to 5000 bar.

5. The process according to claim 1, wherein the cutting stage in (b) further comprises at least one static cutting member.

6. The process according to claim 5, wherein the hydrated polymer is cut by contacting the at least one static cutting member before contacting the at least one stream of aqueous liquid.

7. The process according to claim 1, wherein in the cutting (b), the at least one stream of aqueous liquid is generated from at least one nozzle, wherein at least one nozzle oscillates.

8. The process according to claim 1, wherein in the cutting (b), a multiplicity of streams of aqueous liquid are ejected from a multiplicity of nozzles.

9. The process according to claim 1, wherein in the cutting (b) the at least one stream of aqueous liquid is generated from at least one nozzle, wherein at least one nozzle rotates.

10. The process according to claim 3, wherein in the cutting (b), a curtain of water or other aqueous liquid is provided on the inside of the tubular section.

11. The process according to claim 1, wherein the dissolving (c) comprises (c1) subjecting the hydrated polymer pieces to further size reduction and complete or partial dissolution by a mechanical processing stage, wherein the mechanical processing stage comprises a means for shearing and/or cutting the hydrated polymer pieces in the presence of an aqueous liquid and forming an aqueous solution of the polymer, optionally containing particles of undissolved hydrated polymer, wherein the aqueous solution of polymer, optionally containing particles of undissolved polymer, is passed into a mixing tank to allow any particles of undissolved polymer to dissolve, thereby obtaining the aqueous polymer solution.

12. The process according to claim 11, wherein the mechanical processing stage of (c1) comprises conveying the hydrated polymer pieces into a chamber comprising,
a rotor; and
a fixed stator consisting of a plurality of blades.

13. The process according to claim 12, wherein a distance between the blades of the stator is from 200 to 2000 μm.

14. The process according to claim 1, wherein the dissolving (c) comprises (c2) passing the hydrated polymer pieces of the cutting (b) into a mixing tank comprising an aqueous liquid and allowing the hydrated polymer pieces to dissolve, thereby obtaining the aqueous polymer solution.

15. The process according to claim 1, wherein hydrated polymer in the preparing (a) is from an aqueous solution polymerisation of one or more water-soluble ethylenically unsaturated monomers.

16. The process according to claim 1, wherein the hydrated polymer is a polymer of acrylamide, optionally with other water-soluble ethylenically unsaturated comonomers.

17. The process according to claim 1, wherein the hydrated polymer is selected from the group consisting of a homopolymer of acrylamide; a copolymer of acrylamide with sodium acrylate; and a copolymer of acrylamide with calcium acrylate.

18. The process according to claim 1, wherein the hydrated polymer is selected from the group consisting of a copolymer of acrylamide with ethylenically unsaturated cationic comonomers.

19. The process according to claim 1, wherein the hydrated polymer is of a polymer exhibiting an intrinsic viscosity of at least 3 dl/g.

20. The process according to claim 1, wherein the hydrated polymer comprises from 10 to 80% by weight active polymer.

21. An apparatus, for producing an aqueous polymer solution, comprising
(a) a means for providing passage of a hydrated polymer through the apparatus, wherein the hydrated polymer that has been prepared by aqueous solution polymerisation of ethylenically unsaturated monomers, which hydrated polymer comprises at least 10% by weight active polymer;

(b) at least one means for cutting the hydrated polymer to form hydrated polymer pieces, said means comprising:
at least one rotating nozzle which provides a stream of aqueous liquid at a pressure of at least 150 bar in a circular sweep pattern at an angle to the passage of the hydrated polymer; and/or
least one oscillating nozzle which provides a stream of liquid at a pressure of at least 150 bar in a fan shaped water stream sweep pattern; and/or
a multiplicity of nozzles which provide a multiplicity of streams of aqueous liquid ejected at a pressure of at least 150 bar; and
(c) means for dissolving the hydrated polymer to an aqueous liquid so as to obtain an aqueous polymer solution.

22. The apparatus according to claim 21, wherein the at least one stream of aqueous liquid, comprised by the at least one means (b) for cutting the hydrated polymer, flows from a nozzle having a nozzle orifice diameter of less than 3.00 mm.

23. The apparatus according to claim 21, wherein the means (c) for dissolving the hydrated polymer in the aqueous liquid comprises (c1) a mechanical processing device for subjecting the hydrated polymer pieces to further size reduction and complete or partial dissolution; and/or (c2) a mixing tank containing an aqueous liquid for receiving the hydrated polymer pieces cut by (b) in order to effect a solution of the hydrated polymer pieces.

24. The apparatus according to claim 21, wherein the means (c) comprises (c1)
(i) a device for subjecting the pieces of hydrated polymer to further size reduction and complete or partial dissolution by a mechanical processing device,
which mechanical processing device comprises a means for shearing and/or cutting the hydrated polymer pieces, in the presence of an aqueous liquid, for forming an aqueous solution of the polymer, optionally containing particles of undissolved hydrated polymer,
(ii) a mixing tank, for dissolving undissolved polymer,
(iii) a device for passing the aqueous solution of polymer, optionally containing particles of undissolved polymer into the mixing tank to allow any undissolved polymer to dissolve, thereby providing the aqueous polymer solution.

25. The apparatus according to claim 21, herein the means (c) comprises (c2)
(i) a mixing tank containing an aqueous liquid, for dissolving the hydrated polymer pieces, and
(ii) a device for passing the hydrated polymer pieces cut by (b) into the mixing tank and allowing the hydrated polymer pieces to dissolve, thereby providing the aqueous polymer solution.

* * * * *